(12) United States Patent
Lin

(10) Patent No.: US 12,468,116 B2
(45) Date of Patent: Nov. 11, 2025

(54) ADJUSTABLE MIRROR MOTOR ASSEMBLY

(71) Applicant: GUANGZHOU LUXVISIONS INNOVATION TECHNOLOGY LIMITED, Guangzhou (CN)

(72) Inventor: Jyun-Jie Lin, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 583 days.

(21) Appl. No.: 17/887,751

(22) Filed: Aug. 15, 2022

(65) Prior Publication Data

US 2022/0390708 A1 Dec. 8, 2022

Related U.S. Application Data

(60) Provisional application No. 63/301,689, filed on Jan. 21, 2022.

(51) Int. Cl.
*G02B 7/182* (2021.01)
*G03B 17/17* (2021.01)

(52) U.S. Cl.
CPC ........... *G02B 7/1821* (2013.01); *G03B 17/17* (2013.01)

(58) Field of Classification Search
None
See application file for complete search history.

(56) References Cited

U.S. PATENT DOCUMENTS

| | | | | |
|---|---|---|---|---|
| 3,852,791 | A * | 12/1974 | Eukuda | G03B 19/12 |
| | | | | 396/447 |
| 7,071,973 | B1 * | 7/2006 | Yoshioka | H04N 23/634 |
| | | | | 348/219.1 |
| 10,389,923 | B2 * | 8/2019 | Ho | H10F 39/804 |
| 2012/0063763 | A1 * | 3/2012 | Yamada | G03B 19/12 |
| | | | | 396/447 |
| 2013/0136441 | A1 * | 5/2013 | Yamada | G03B 19/12 |
| | | | | 396/447 |
| 2017/0336596 | A1 * | 11/2017 | Nishimoto | G02B 7/18 |
| 2018/0321504 | A1 * | 11/2018 | Hu | G02B 7/09 |

* cited by examiner

*Primary Examiner* — Ryan Crockett
(74) *Attorney, Agent, or Firm* — Birch, Stewart, Kolasch & Birch, LLP

(57) ABSTRACT

An adjustable mirror motor assembly includes a base, a mirror motor component, and a housing. The mirror motor component is fixed on the base and includes a mount and a dragging member. The mount is fixed on the base. A pivot end of the dragging member is pivotally connected to a pivot portion of the mount, and a slide end of the dragging member is slidably disposed in a slide portion of the mount, so that the slide end is pivotally rotated with respect to the pivot end and is slidably moved in the slide portion. A magnet component is on a magnet fixation portion of the dragging member. A mirror is on a mirror fixation portion of the dragging member. The housing covers the base and the mirror motor component.

5 Claims, 7 Drawing Sheets

ADJUSTABLE MIRROR MOTOR ASSEMBLY

CROSS-REFERENCE TO RELATED APPLICATION

This application claims the benefit of U.S. provisional application Ser. No. 63/301,689, filed on Jan. 21, 2022, the entire contents of which are hereby incorporated by reference.

BACKGROUND

Technical Field

The instant disclosure relates to a mirror motor assembly, in particular, to an adjustable mirror motor assembly.

Related Art

In general, a mobile device (such as a mobile phone or a tablet computer) is provided with a lens assembly, for example, a periscope camera module. However, although the periscope camera module can achieve the telephoto configuration through an elongated lens, the focal length of the camera module cannot be changed.

SUMMARY

In view of this, in one embodiment, an adjustable mirror motor assembly adapted for a lens assembly of a mobile device is provided. The adjustable mirror motor assembly comprises a base, a mirror motor component, and a housing. The mirror motor component is fixed on the base and comprises a mount and a dragging member. The mount is fixed on the base and has a pivot portion, a slide portion, and a coil fixation portion. The pivot portion and the slide portion are at two opposite ends of the mount, and at least one coil is on the coil fixation portion. The dragging member has a pivot end, a slide end, a magnet fixation portion, and a mirror fixation portion. The pivot end is pivotally connected to the pivot portion, and the slide end is slidably disposed in the slide portion, so that the slide end is pivotally rotated with respect to the pivot end and is slidably moved in the slide portion. The magnet fixation portion is at a side portion of the dragging member, and a magnet component is on the magnet fixation portion. A mirror is on the mirror fixation portion. The housing covers the base and the mirror motor component.

In some embodiments, the lens assembly comprises a first lens group, a second lens group, and an optical sensing component, the first lens group, the second lens group, and the optical sensing component are sequentially arranged with each other, and the adjustable mirror motor assembly is disposed between the first lens group and the second lens group.

In some embodiments, the number of the at least one coil is plural, the coil fixation portion comprises a plurality of fixation regions sequentially arranged on a sliding path of the dragging member, and the coils are respectively fixed on the fixation regions.

In some embodiments, each of the fixation regions has two fixation posts at two opposite ends thereof, and each of the coils is wound on the two fixation portions of a corresponding one of the fixation regions.

In some embodiments, the at least one coil is a flat coil, and the flat coil comprises a plurality of coil patterns sequentially arranged on a sliding path of the dragging member.

In some embodiments, the mirror motor component comprises a position sensing element disposed on the mount to determine a position of the dragging member.

Based on the above, according to one or some embodiments of the instant disclosure, an adjustable mirror motor assembly is provided and is adapted for a lens assembly. The adjustable mirror motor assembly is adapted to adjust the angle of the mirror, so that the mobile device can be switched between the long focal length mode and the short focal length mode.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
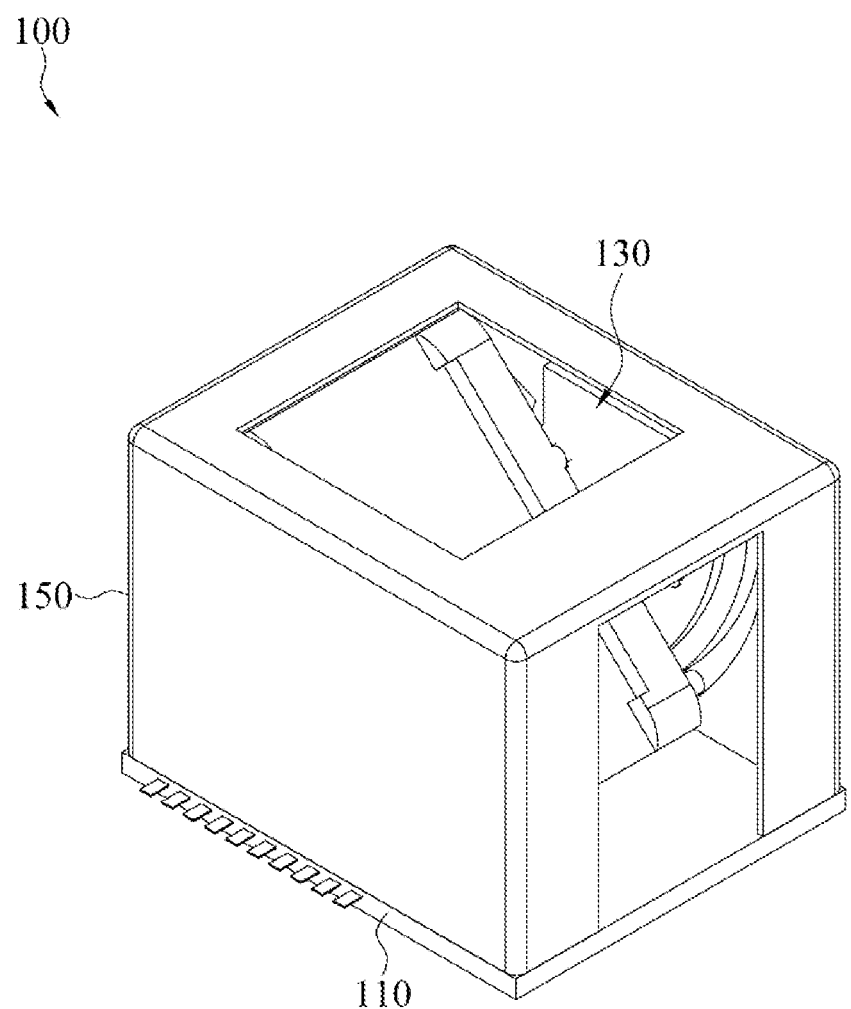
FIG. 1 illustrates a perspective view of an adjustable mirror motor assembly according to a first embodiment of the instant disclosure.
Figure 2:
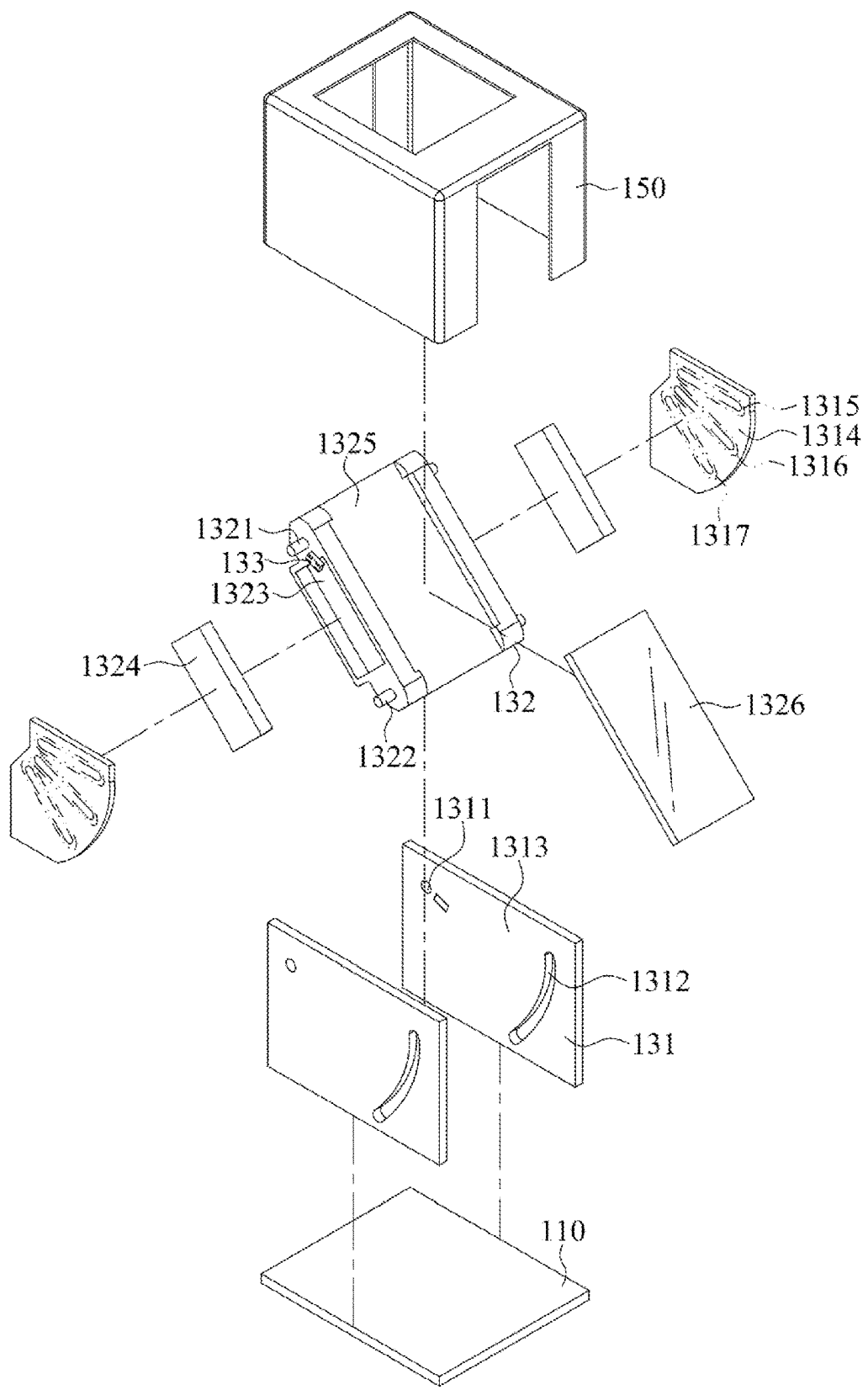
FIG. 2 illustrates an exploded view of the adjustable mirror motor assembly according to the first embodiment of the instant disclosure.

Please refer to FIG. 1 and FIG. 2. FIG. 1 illustrates a perspective view of an adjustable mirror motor assembly according to a first embodiment of the instant disclosure. FIG. 2 illustrates an exploded view of the adjustable mirror motor assembly according to the first embodiment of the instant disclosure. The adjustable mirror motor assembly 100 comprises a base 110, a mirror motor component 130, and a housing 150. The housing 150 covers the base 110 and the mirror motor component 130. In the first embodiment, the adjustable mirror motor assembly 100 is adapted for a lens assembly 310 of a mobile device, and the lens assembly 310 may be for example adapted for a periscope lens assembly.

The mirror motor component 130 is fixed on the base 110, and the mirror motor component 130 comprises a mount 131 and a dragging member 132. In the first embodiment, the mirror motor component is assembled on the base 110 through the mount 131. Metallic members are embedded in the base 110 and the mount 131, and the metallic members in the base 110 and the mount 131 can be electrically connected with each other through soldering conduction. The mount 131 has a pivot portion 1311, a slide portion 1312, and a coil fixation portion 1313. The pivot portion 1311 and the slide portion 1312 are at two opposite ends of the mount 131. At least one coil is on the coil fixation portion 1313. The dragging member 132 has a pivot end 1321, a slide end 1322, a magnet fixation portion 1323, and a mirror fixation portion 1325. The pivot end 1321 is pivotally connected to the pivot portion 1311, and the slide end 1322 is slidably disposed in the slide portion 1312, so that the slide end 1322 is pivotally rotated with respect to the pivot end 1321 and is slidably moved in the slide portion 1312. A magnet component 1324 is on the magnet fixation portion 1323. A mirror 1326 is on the mirror fixation portion 1325. The coil may be a flat coil or a winding coil.

Figure 3A:
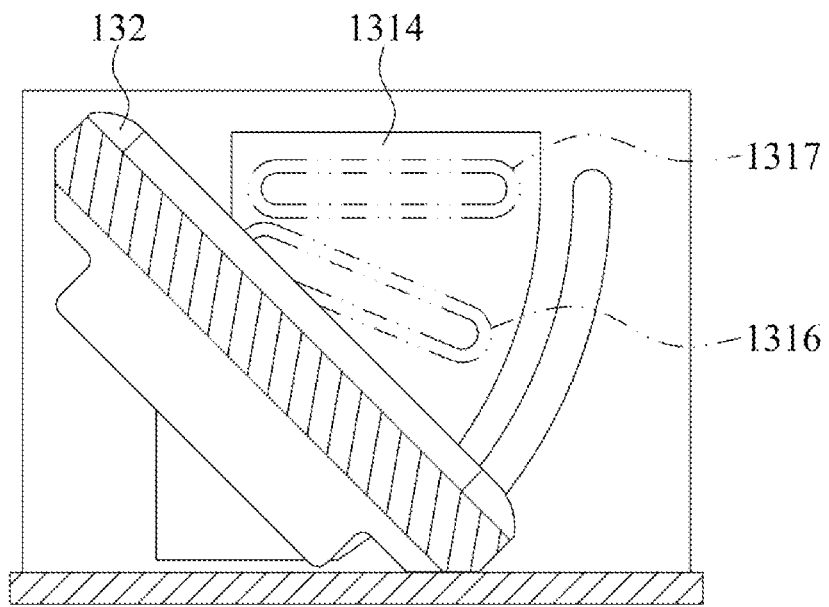
FIG. 3A illustrates a schematic view (1) showing the movement of a dragging member of the adjustable mirror motor assembly according to the first embodiment of the instant disclosure.
Figure 3B:
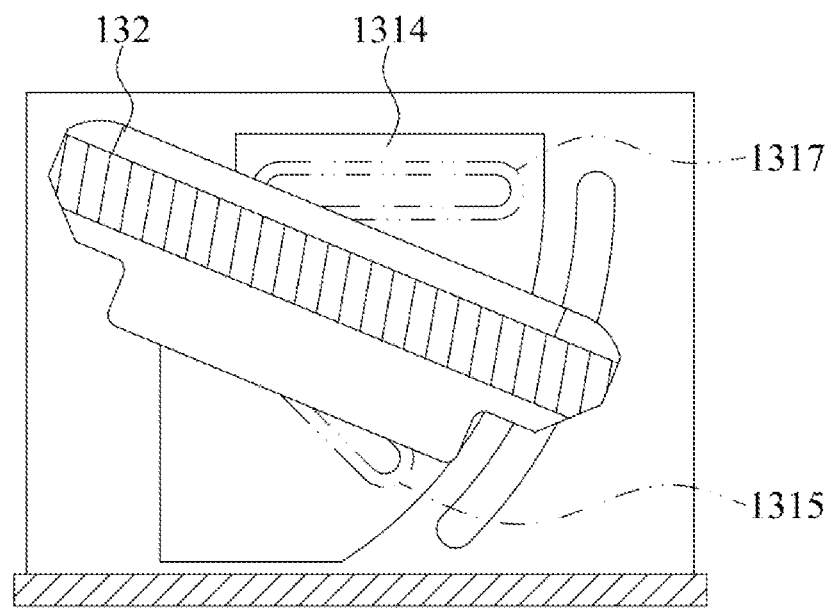
FIG. 3B illustrates a schematic view (2) showing the movement of the dragging member of the adjustable mirror motor assembly according to the first embodiment of the instant disclosure.
Figure 3C:
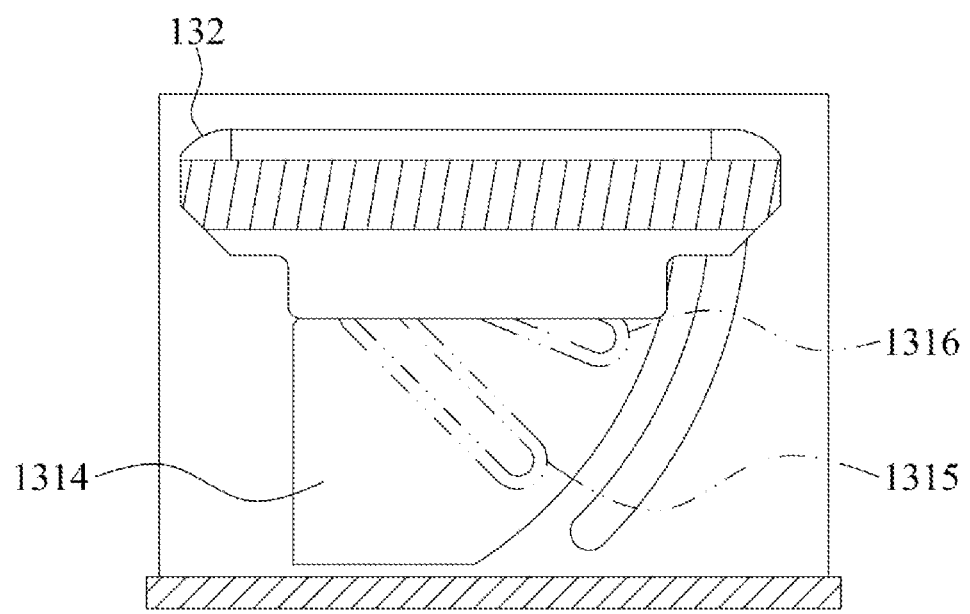
FIG. 3C illustrates a schematic view (3) showing the movement of the dragging member of the adjustable mirror motor assembly according to the first embodiment of the instant disclosure.

Please refer to FIG. 3A to FIG. 3C. FIG. 3A to FIG. 3C respectively illustrate schematic views (1) to (3) showing the movement of a dragging member of the adjustable mirror motor assembly according to the first embodiment of the instant disclosure. In the first embodiment, the coil may be a flat coil 1314. The flat coil 1314 comprises a plurality of coil patterns 1315, 1316, 1317. The number of the coil patterns 1315, 1316, 1317 may be three, but not limited thereto. In this embodiment, the coil patterns 1315, 1316, 1317 are a first coil pattern 1315, a second coil pattern 1316, and a third coil pattern 1317. The first coil pattern 1315, the second coil pattern 1316, and the third coil pattern 1317 are sequentially arranged on a sliding path of the dragging member 132. In the first embodiment, through the magnetic field generated by the magnet component 1324 and the flat coil 1314, the dragging member 132 is pivotally rotated with respect to the mount 131, so that the position of the mirror 1326 can be changed.

Specifically, please refer to FIG. 2 and FIG. 3A to FIG. 3C at the same time. In this embodiment, when the mirror 1326 is to be moved from the position of the first coil pattern 1315 to the position of the third coil pattern 1317, firstly through the magnetic field generated between the magnet component 1324 and the first coil pattern 1315, a force toward the second coil pattern 1316 is generated to allow the dragging member 132 to pivot and to allow the slide end 1322 to slide in the slide portion 1312 of the mount 131, so that the dragging member 132 is moved to the position of the second coil pattern 1316. When the dragging member 132 reaches the position of the second coil pattern 1316, the second coil pattern 1316 and the magnet component 1324 generate a force toward the third coil pattern 1317 to move the dragging member 132. When the dragging member 132 reaches the positon of the third coil pattern 1317, the third coil pattern 1317 and the magnet component 1324 generate a force to maintain the dragging member 132 at the position of the third coil pattern 1317. Therefore, the position of the mirror 1326 can be changed through the magnetic field generated by the magnet component 1324 and the coil patterns 1315, 1316, 1317 of the flat coil 1314.

Figure 4A:
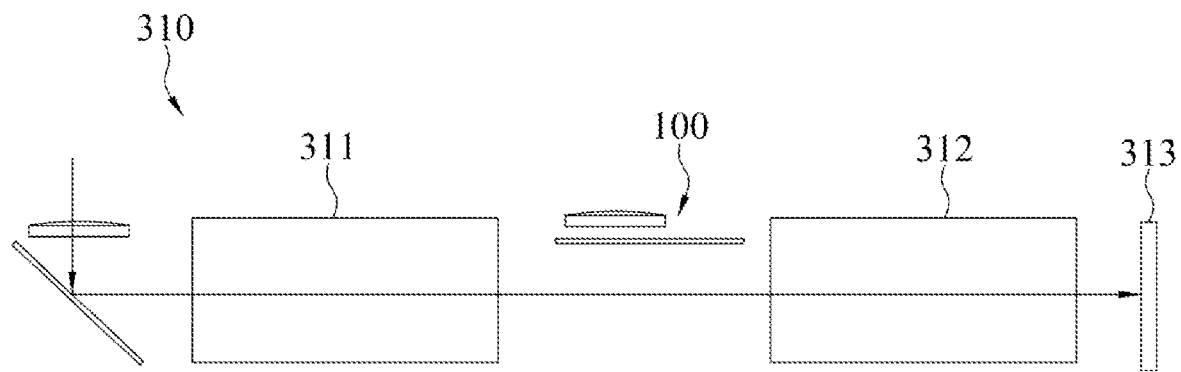
FIG. 4A illustrates a schematic view (1) of a lens assembly of a mobile device according to the first embodiment of the instant disclosure.
Figure 4B:
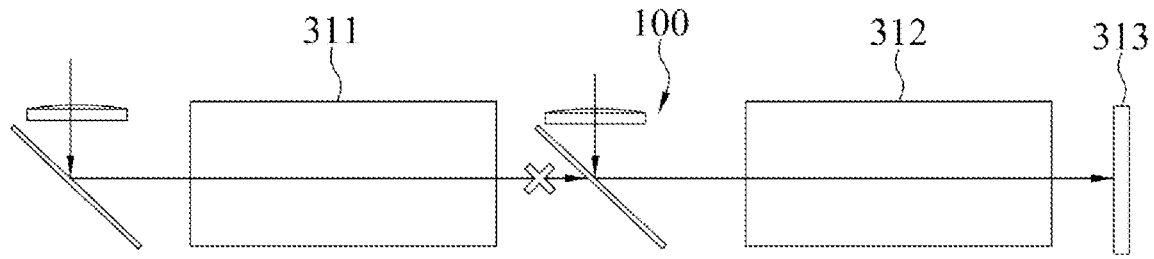
FIG. 4B illustrates a schematic view (2) of the lens assembly of the mobile device according to the first embodiment of the instant disclosure.

Please refer to FIG. 4A and FIG. 4B. FIG. 4A and FIG. 4B respectively illustrate schematic views (1) and (2) of a lens assembly of a mobile device according to the first embodiment of the instant disclosure. Specifically, in this embodiment, the adjustable mirror motor assembly 100 is adapted for a lens assembly 310 of a mobile device. The lens assembly 310 comprises a first lens group 311, a second lens group 312, and an optical sensing component 313, the first lens group 311, the second lens group 312, and the optical sensing component 313 are sequentially arranged with each other, and the adjustable mirror motor assembly 100 is disposed between the first lens group 311 and the second lens group 312. By changing the position of the mirror of the adjustable mirror motor assembly 100, the mobile device can be switched between the long focal length mode and the short focal length mode. As shown in FIG. 4A, when the mobile device is to be in the long focal length mode, the adjustable mirror motor assembly 100 moves the mirror 1326 to the position of the third coil pattern 1317, so that the light transmitted through a lens corresponding to the adjustable mirror motor assembly 100 can pass through the first lens group 311 and the second lens group 312 to reach the optical sensing component 131 to achieve the long focal length effect. As shown in FIG. 4B, when the mobile device is to be in the short focal length mode, the adjustable mirror motor assembly 100 moves the mirror 1326 to the position of the first coil pattern 1315 to block the light from the first lens group 311, and the light transmitted through the lens corresponding to the adjustable mirror motor assembly 100 is reflected by the mirror 1326 and passes through the second lens group 312 to reach the optical sensing component 313 to achieve the short focal length effect. Therefore, the mobile device can be switched between the long focal length mode and the short focal length mode by adjusting the angle of the mirror 1326.

In the first embodiment, the mobile device comprises a gyroscope, a position of the mobile device is determined by the gyroscope, and the mirror motor component 130 controls the flat coil 1314 for conduction. Specifically, in this embodiment, the mobile device determines the relative position between a light axis and the direction of gravity through the gyroscope, and the mobile device further controls the electrical conduction of the coil patterns 1315, 1316, 1317 through the mirror motor component 130. As shown in FIG. 4A and FIG. 3A to FIG. 3C, in the long focal length mode, since the third coil pattern 1317 is at a direction opposite to the direction of gravity, the mirror motor component 130 has to control the third coil pattern 1317 to be in electrical conduction continuously to maintain the dragging member 132 at the position of the third coil pattern 1317. As shown in FIG. 4B and FIG. 3A to FIG. 3C, under the condition that the light axis is aligned upwardly, in the short focal length mode, because the first coil pattern 1315 is at a direction same as the direction of gravity, the mirror motor component 130 can control the first coil pattern 1315 to reduce the discharging of the first coil pattern 1315 or not to allow the first coil pattern 1315 to be in electrical conduction, so that the dragging member 132 can be maintained at the position of the first coil pattern 1315.

Figure 5:
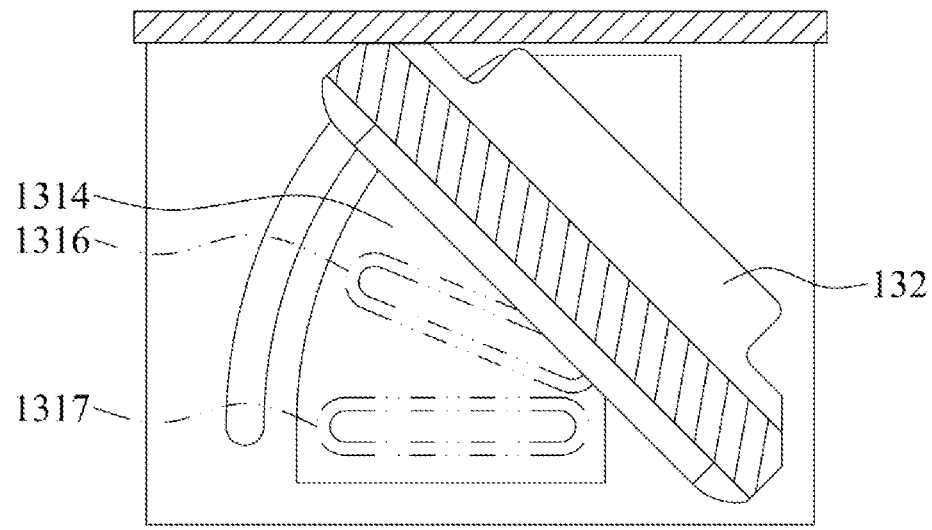
FIG. 5 illustrates a schematic view (1) of another light axis of the mobile device according to the first embodiment of the instant disclosure.
Figure 6:
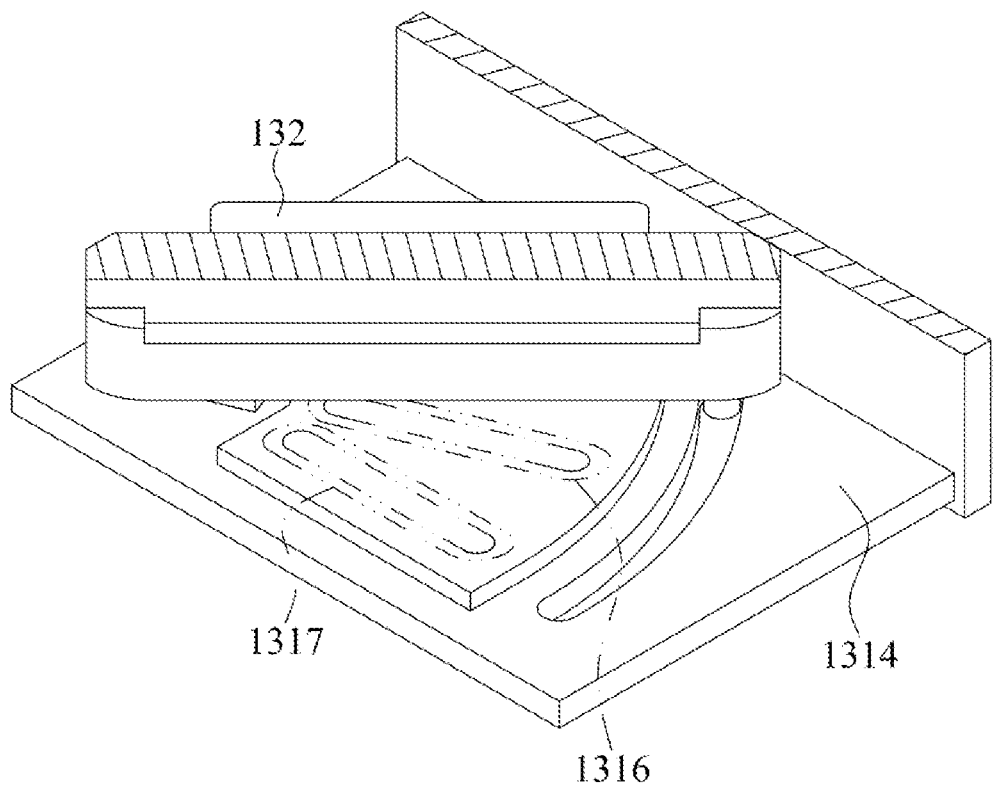
FIG. 6 illustrates a schematic view (2) of another light axis of the mobile device according to the first embodiment of the instant disclosure.

Please refer to FIG. 5 and FIG. 6. FIG. 5 and FIG. 6 respectively illustrate schematic views (1) and (2) of another light axis of the mobile device according to the first embodiment of the instant disclosure. As shown in FIG. 5, under the condition that the light axis is aligned downwardly, in the short focal length mode, because the first coil pattern 1315 is at a direction opposite to the direction of gravity, the mirror motor component 130 has to control the first coil pattern 1315 to be in electrical conduction continuously to maintain the dragging member 132 at the position of the first coil pattern 1315. In the long focal length mode, because the third coil pattern 1317 is at a direction same as the direction of gravity, the mirror motor component 130 can control the third coil pattern 1317 to reduce the discharging of the third coil pattern 1317 or not to allow the third coil pattern 1317 to be in electrical conduction, so that the dragging member 132 can be maintained at the position of the third coil pattern 1317. Moreover, under the condition that the light axis is aligned horizontally, the first coil pattern 1315, the second coil pattern 1316, and the third coil pattern 1317 are all on a horizontal plane perpendicular to the direction of gravity. Therefore, under this configuration, since the movement of the dragging member 132 is not against the gravity, the discharging of the first coil pattern 1315 to the third coil pattern 1317 can be reduced.

Please refer to FIG. 2 and FIG. 3A to FIG. 3C again. In the first embodiment, the mirror motor component 130 further comprises a position sensing component 133 disposed on the mount 131 to detect a position of the dragging member 132. The position sensing component 133 is in electrical conduction with the base 110 through the metallic members embedded in the mount 131 and is connected to the mobile device. The position sensing component 133 is a Hall effect sensor, and the Hall effect sensor can determine the position of the magnet component 1324 by sensing the current and the magnetic field. In the first embodiment, the position of the dragging member 132 is determined by the position sensing component 133, and the conduction states of the first coil pattern 1315 to the third coil pattern 1317 are controlled according to the position of the dragging member 132. For example, in the case that the dragging member 132 is to be moved from the first coil pattern 1315 to the second coil pattern 1316, when the position sensing component 133 detects that the dragging member 132 is near the second dragging member 1316, the second coil pattern 1316 is controlled to be in electrical conduction to generate the magnetic field so as to keep moving the dragging member 132 to come close to the second coil pattern 1316. Alternatively, in another example, when the position sensing component 133 detects that the dragging member 132 is between the first coil pattern 1315 and the second coil pattern 1316, the second coil pattern 1316 is controlled to be in electrical conduction to generate the magnetic field so as to attract the dragging member 132 to come close to the second coil pattern 1316; while when the position sensing component 133 detects that the dragging member 132 is between the second coil pattern 1316 and the third coil pattern 1317, the second coil pattern 1316 is controlled to move the dragging member 132 to come close to the third coil pattern 1317. Moreover, the position of the dragging member 132 may be determined through codes. In some embodiments, in a binary manner, the movement paths of the dragging member 132 with respect to the first coil pattern 1315, the second coil pattern 1316, and the third coil pattern 1317 are divided into the position 1 (code 0), the position 2 (code 512), and the position 3 (code 1023), respectively. Therefore, when the dragging member 132 is at a preset position (at one of the position 1, the position 2, and the position 3), the conduction states of the first coil pattern 1315, the second coil pattern 1316, and the third coil pattern 1317 can be controlled according to the position of the dragging member 132.

In the first embodiment, the determination of the position of the dragging member 132 and the control of the conduction states of the first coil pattern 1315 to the third coil pattern 1317 can be achieved not only by the position sensing component 133 but also by the time. For example, the mirror motor component 130 comprises a timer element disposed on the mount 131. The time for moving the dragging member 132 from the first coil pattern 1315 to the third coil pattern 1317 is recorded by the timer element, and the electrical conduction of the first coil pattern 1315 to the third coil pattern 1317 can be controlled according to the recorded time.

Figure 7:
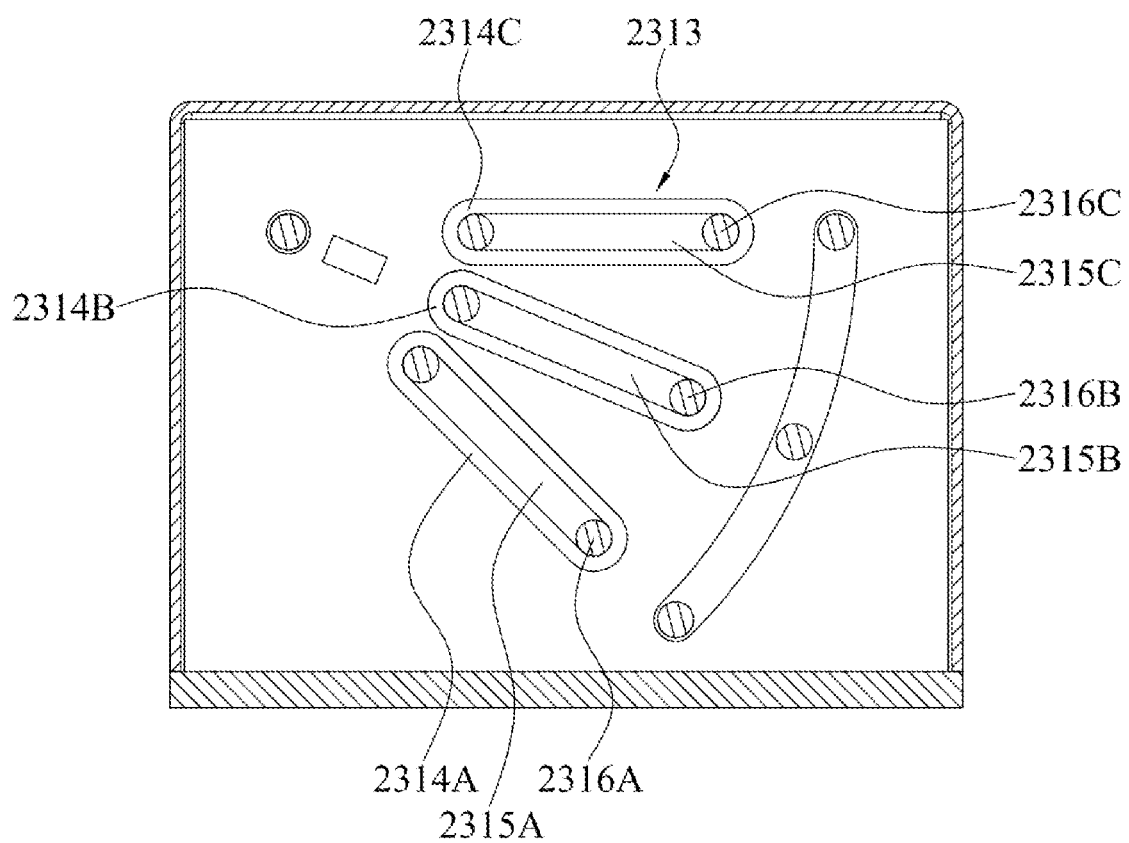
FIG. 7 illustrates a schematic view of a mirror motor component according to a second embodiment of the instant disclosure.

Please refer to FIG. 7. FIG. 7 illustrates a schematic view of a mirror motor component according to a second embodiment of the instant disclosure. Same structures between the first embodiment and the second embodiment are not described again. In the second embodiment, the coil for example may be a plurality of winding coils 2314A, 2314B, 2314C. The number of the winding coils 2314A, 2314B, 2314C may be three, but not limited thereto. In this embodiment, the winding coils 2314A, 2314B, 2314C are a first winding coil 2314A, a second winding coil 2314B, and a third winding coil 2314C. The coil fixation portion 2313 has a plurality of fixation regions 2315A, 2315B, 2315C. The number of the fixation regions 2315A, 2315B, 2315C may be three, but not limited thereto. In this embodiment, the fixation regions 2315A, 2315B, 2315C are a first fixation region 2315A, a second fixation region 2315B, and a third fixation region 2315C. The first fixation region 2315A, the second fixation region 2315B, and the third fixation region 2315C are sequentially arranged on a sliding path of the dragging member 132. The first winding coil 2314A, the second winding coil 2314B, and the third winding coil 2314C are respectively fixed on the first fixation region 2315A, the second fixation region 2315B, and the third fixation region 2315C. In the second embodiment, the first fixation region 2315A has two first fixation posts 2316A at two opposite ends thereof, the second fixation region 2315B has two second fixation posts 2316B at two opposite ends thereof, and the third fixation region 2315C has two third fixation posts 2316C at two opposite ends thereof. The first winding coil 2314A is wound on the two first fixation posts 2316A, the second winding coil 2314B is wound on the two second fixation posts 2316B, and the third winding coil 2314C is wound on the two third fixation posts 2316C. Therefore, through the magnetic field generated by the magnet component 1324 and one of the first winding coil 2314A, the second winding coil 2314B, and the third winding coil 2314C, the dragging member 132 can be pivotally rotated with respect to the mount 131, so that the position of the mirror 1326 can be changed. Therefore, the mobile device can be switched between the long focal length mode and the short focal length mode.

Based on the above, according to one or some embodiments of the instant disclosure, an adjustable mirror motor assembly is provided and is adapted for a lens assembly. The adjustable mirror motor assembly is adapted to adjust the angle of the mirror, so that the mobile device can be switched between the long focal length mode and the short focal length mode.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An adjustable mirror motor assembly adapted for a lens assembly of a mobile device, wherein the adjustable mirror motor assembly comprises:
    a base;
    a mirror motor component fixed on the base, wherein the mirror motor component comprises:

a mount fixed on the base, wherein the mount has a pivot portion, a slide portion, and a coil fixation portion; the pivot portion and the slide portion are at two opposite ends of the mount, and a plurality of coils are on the coil fixation portion, the coil fixation portion comprises a plurality of fixation regions sequentially arranged on a sliding path of the dragging member, and the coils are respectively fixed on the fixation regions; and a dragging member having a pivot end, a slide end, a magnet fixation portion, and a mirror fixation portion, wherein the pivot end is pivotally connected to the pivot portion, and the slide end is slidably disposed in the slide portion, so that the slide end is pivotally rotated with respect to the pivot end and is slidably moved in the slide portion; the magnet fixation portion is at a side portion of the dragging member, and a magnet component is on the magnet fixation portion; a mirror is on the mirror fixation portion; and a housing covering the base and the mirror motor component.

2. The adjustable mirror motor assembly according to claim 1, wherein the lens assembly comprises a first lens group, a second lens group, and an optical sensing component, the first lens group, the second lens group, and the optical sensing component are sequentially arranged with each other, and the adjustable mirror motor assembly is disposed between the first lens group and the second lens group.

3. The adjustable mirror motor assembly according to claim 1, wherein each of the fixation regions has two fixation posts at two opposite ends thereof, and each of the coils is wound on the two fixation posts of a corresponding one of the fixation regions.

4. The adjustable mirror motor assembly according to claim 1, wherein the plurality of coils are flat coils, and the flat coils respectively comprise a plurality of coil patterns sequentially arranged on a sliding path of the dragging member.

5. The adjustable mirror motor assembly according to claim 1, wherein the mirror motor component comprises a position sensing element disposed on the mount to determine a position of the dragging member.

* * * * *